(12) United States Patent
Kasuya (10) Patent No.: US 8,994,977 B2
(45) Date of Patent: Mar. 31, 2015

(54) IMAGE TRANSMISSION APPARATUS AND METHOD OF CONTROLLING IMAGE TRANSMISSION APPARATUS

(75) Inventor: Kenji Kasuya, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 78 days.

(21) Appl. No.: 13/088,977

(22) Filed: Apr. 18, 2011

(65) Prior Publication Data

US 2011/0261386 A1 Oct. 27, 2011

(30) Foreign Application Priority Data

Apr. 27, 2010 (JP) ................. 2010-102526

(51) Int. Cl.
| | |
|---|---|
| G06K 15/00 | (2006.01) |
| G06F 21/60 | (2013.01) |
| G06F 3/12 | (2006.01) |
| G06G 7/48 | (2006.01) |
| G06F 15/16 | (2006.01) |

(52) U.S. Cl.
CPC .................................... G06F 21/608 (2013.01)
USPC .............. 358/1.14; 358/1.15; 703/3; 709/206

(58) Field of Classification Search
CPC ...... G06F 15/16; G06F 15/163; G06F 15/177
See application file for complete search history.

(56) References Cited

U.S. PATENT DOCUMENTS

| | | | | |
|---|---|---|---|---|
| 7,616,334 B2 * | 11/2009 | Niitsuma | ..................... | 358/1.15 |
| 2005/0188226 A1 | 8/2005 | Kasatani | | |
| 2005/0289126 A1 * | 12/2005 | Koguchi | ........................... | 707/3 |
| 2007/0022171 A1 * | 1/2007 | Oomori | ......................... | 709/206 |
| 2009/0279134 A1 * | 11/2009 | Fujii | .......................... | 358/1.15 |

FOREIGN PATENT DOCUMENTS

| | | |
|---|---|---|
| JP | 2001-352439 A | 12/2001 |
| JP | 2005-242521 A | 9/2005 |

* cited by examiner

*Primary Examiner* — Fred Guillermety
*Assistant Examiner* — Henok A Shiferaw
(74) *Attorney, Agent, or Firm* — Canon USA Inc IP Division (57) ABSTRACT

An image transmission apparatus includes a destination setting unit configured to set a transmission destination of image data, a transmission unit configured to transmit the image data to the destination set by the destination setting unit, an authentication unit configured to perform processing for authentication required for the transmission unit to transmit the image data to the destination set by the destination setting unit, a storage unit configured to store a destination table in which authentication information required for the authentication unit to perform the processing for authentication is registered in such a manner that the authentication information is associated with the destination, a selection unit configured to select one of a first authentication mode, in which the authentication unit performs the processing for authentication using the authentication information stored in the storage unit when the transmission unit transmits the image data to the destination set by the destination setting unit, and a second authentication mode, in which the authentication unit performs the processing for authentication using authentication information entered by a user when the transmission unit transmits the image data to the destination set by the destination setting unit, and a limitation unit configured to limit a number of destinations to which the transmission unit transmits the image data when the selection unit selects the second authentication mode.

10 Claims, 11 Drawing Sheets

| idx | DESTINATION TABLE No. | PROTOCOL TYPE | SERVER | FOLDER PATH |
|---|---|---|---|---|
| 1 | 001 | SMB | ¥¥smb_server1 | ¥folder1 |
| 2 | 002 | SMB | ¥¥smb_server2 | ¥folder2 |
| 3 | 003 | FTP | ftp.mydomain.jp | ftp_root |
| . | . | . | . | . |
| . | . | . | . | . |

FIG. 6

| idx | DESTINATION TABLE No. | PROTOCOL TYPE | SERVER | FOLDER PATH | USER NAME | PASSWORD |
|---|---|---|---|---|---|---|
| 1 | 001 | SMB | ¥¥smb_server1 | ¥folder1 | user1 | pass1 |
| 2 | 002 | SMB | ¥¥smb_server2 | ¥folder2 | user2 | pass2 |
| 3 | 003 | FTP | ftp.mydomain.jp | ftp_root | user3 | pass3 |
| . . | . . | . . | . . | . . | . . | . . |

IMAGE TRANSMISSION APPARATUS AND METHOD OF CONTROLLING IMAGE TRANSMISSION APPARATUS

BACKGROUND OF THE INVENTION

1. Field of the Invention

The present invention relates to an image transmission apparatus capable of transmitting image data to a plurality of transmission destinations.

2. Description of the Related Art

There is known an image transmission apparatus provided with a multi-address transmission function of transmitting image data to a plurality of transmission destinations. Many of such apparatuses have a destination table, a one-touch key, or another means for registering transmission destinations in advance, which enables a selection and specification of a plurality of destinations from these pre-registered transmission destinations for multi-address transmission.

Further, there is also known an image transmission apparatus provided with a multi-protocol multi-address transmission function of transmitting image data to a plurality of addresses using respectively different protocols such as an electronic mail (E-mail) and a file transfer (File Transfer Protocol (FTP)) (for example, Japanese Patent Application Laid-Open No. 2001-352439). The image transmission apparatus provided with the multi-protocol multi-address transmission function can register user authentication information such as a username and a password used in a communication protocol for each transmission destination in the destination table or the one-touch key in such a manner that the authentication information is associated with the corresponding transmission destination information.

Further, there is also known an image transmission apparatus provided with an "each-time authentication transmission function" (also referred to as "manual authentication transmission function"). According to the each-time authentication transmission function, for multi-protocol multi-address transmission, every time an image transmission apparatus transmits image data to each destination, the image transmission apparatus prompts a user to input authentication information (username and password) for that transmission destination. Such an image transmission apparatus displays a user authentication information input screen for an input of, for example, a username and a password before the transmission, and transmits image data after the user inputs the authentication information. Generally, a destination located at a Server Message Block (SMB) server and a destination located at an FTP server require different authentication information for each destination due to, for example, different authentication mechanisms allowing an access to the server for each server as a destination. For multi-protocol multi-address transmission in which such servers are set as destinations, the image transmission apparatus displays an authentication information input screen every time the apparatus transmits image data to each destination. Thus, this should be followed by user's operation of inputting authentication information for each destination.

Since each destination requires different authentication information, a user has to input correct authentication information for each of a plurality of destinations. However, it is difficult for a user to input correct authentication information for all of the destinations, and an input of incorrect authentication information for a destination leads to a failure in the transmission.

SUMMARY OF THE INVENTION

The present invention is directed to an image transmission apparatus provided with the multi-address transmission function and the each-time authentication transmission function, and capable of reducing an error in an input of authentication information.

According to an aspect of the present invention, an image transmission apparatus includes a destination setting unit configured to set a transmission destination of image data, a transmission unit configured to transmit the image data to the destination set by the destination setting unit, an authentication unit configured to perform processing for authentication required for the transmission unit to transmit the image data to the destination set by the destination setting unit, a storage unit configured to store a destination table in which authentication information required for the authentication unit to perform the processing for authentication is registered in such a manner that the authentication information is associated with the destination, a selection unit configured to select one of a first authentication mode, in which the authentication unit performs the processing for authentication using the authentication information stored in the storage unit when the transmission unit transmits the image data to the destination set by the destination setting unit, and a second authentication mode, in which the authentication unit performs the processing for authentication using authentication information entered by a user when the transmission unit transmits the image data to the destination set by the destination setting unit, and a limitation unit configured to limit a number of destinations to which the transmission unit transmits the image data in a case that the selection unit selects the second authentication mode.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
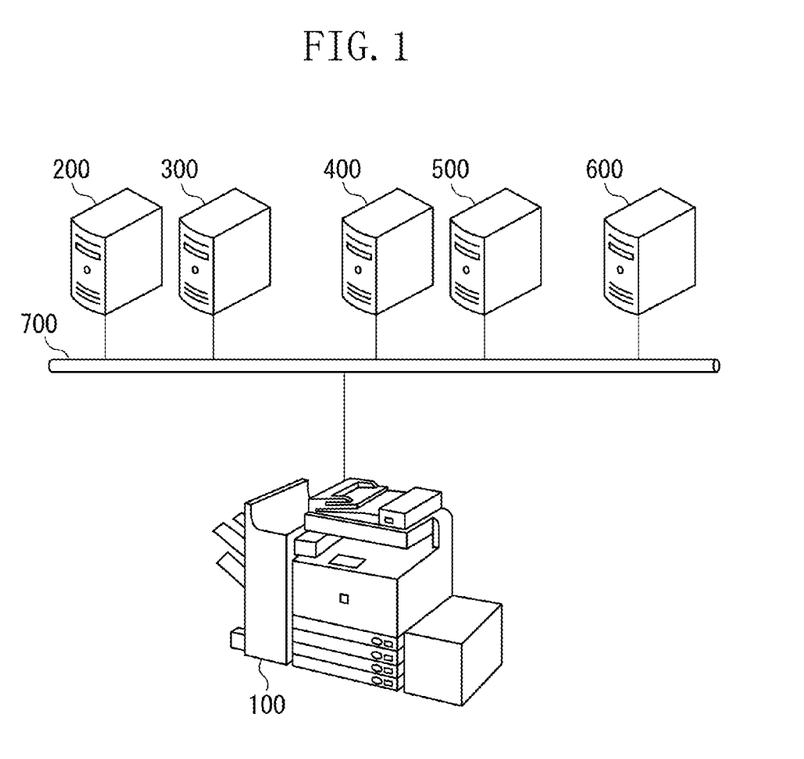
FIG. 1 illustrates an example of a system configuration of an image communication system including an image transmission apparatus according to an exemplary embodiment of the present invention.

FIG. 1 illustrates an example of a system configuration of an image communication system including an image transmission apparatus according to an exemplary embodiment of the present invention.

A multifunctional peripheral (MFP) 100, which is an example of the image transmission apparatus, is connected to a first SMB server 200, a second SMB server 300, a first FTP server 400, a second FTP server 500, and a Simple Mail Transfer Protocol (SMTP) server 600 via a local area network (LAN) 700.

The MFP 100 realizes the image transmission function by transmitting data to the above-described respective servers with use of predetermined network communication protocols. The MFP 100 can use a plurality of types of communication protocols to transmit data.

The first SMB server 200 and the second SMB server 300 each are a file server using SMB (Server Message Block), which is a protocol for sharing a file. The first FTP server 400 and the second FTP server 500 each are a file server using FTP (File Transfer Protocol). The SMTP server 600 receives an electric mail transmitted from, for example, the MFP 100 by using SMTP (Simple Mail Transfer Protocol), and transfers the electric mail to a Post Office Protocol (POP) server according to the destination of the electric mail. In the present exemplary embodiment, user authentication is required for the MFP 100 to access each of the first SMB server 200, the second SMB server 300, the first FTP server 400, the second FTP server 500, and the SMTP server 600. Authentication information (for example, a user identification (ID) and a password) required for the user authentication is different for each server. Further, the image communication system may include a Lightweight Directory Access Protocol (LDAP) server for these types (not-illustrated) of user authentication.

Figure 2:
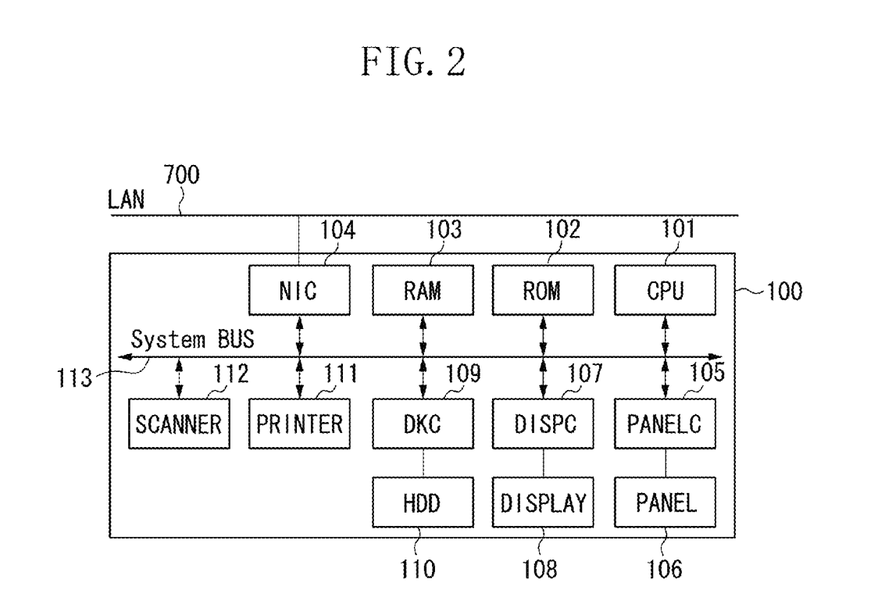
FIG. 2 is a block diagram illustrating an example of a hardware configuration of a multifunction peripheral (MFP).

FIG. 2 is a block diagram illustrating an example of a hardware configuration of the MFP 100.

The MFP 100 includes a central processing unit (CPU) 101, a read only memory (ROM) 102, a random access memory (RAM) 103, a network interface card (NIC) 104, an operation input controller (PANELC) 105, and a touch panel (PANEL) 106. The MFP 100 further includes a display controller (DISPC) 107, a display (DISPLAY, display unit) 108, a disk controller (DKC) 109, a hard disk (HDD) 110, a printer unit (PRINTER) 111, and a scanner unit (SCANNER) 112.

The CPU 101 is in charge of overall control of devices connected to a system bus 113, and execution of firmware modules stored in the ROM 102, or the HDD 110, which is a mass storage device. As the firmware modules, there are at least two modules. Updating the firmware modules can be executed individually for each module.

Further, the CPU 101 performs processing illustrated in the flowcharts that will be described below, based on the firmware modules as the control programs. In some cases, the HDD 110 may be also used as a space for temporarily storing an image. The RAM 103 serves as a main memory and a work area for the CPU 101. In the present exemplary embodiment, the single CPU 101 executes various programs, but a plurality of CPUs may execute those programs in collaboration with one another.

The PANELC 105 controls an instruction input from the PANEL 106 provided to the MFP 100. The PANEL 106 includes various kinds of buttons, keys, a touch panel sheet, and the like, and constitutes an operation unit of the MFP 100. The DISPC 107 controls image drawing applied to the DISPLAY 108. The DISPLAY 108 is constituted by, for example, a liquid crystal display, and displays an operation screen of the MFP 100. The operation unit of the MFP 100 is constituted by the PANEL 106 and the DISPLAY 108.

The NIC 104 is in charge of exchanges of data with another MFP (not illustrated), the servers illustrated in FIG. 1, or the not-illustrated LDAP server via the LAN 700. The PRINTER 111 forms an image on a recording sheet by the electrophotographic method. The SCANNER 112 reads an image printed on a recording sheet. The SCANNER 112 is equipped with a not-illustrated auto document feeder, and thereby can automatically read a plurality of documents.

The MFP 100 according to the present exemplary embodiment is configured to perform the device authentication, and the transmission authentication, which is an example of the function authentication. The device authentication is realized by storage of an authentication table containing department IDs and passwords in the HDD 110 of the MFP 100, and a check of a department ID and a password input by a user against the table. For the transmission authentication, the MFP 100 communicates with, for example, the LDAP server via the LAN 700 to authenticate a user. In the present exemplary embodiment, a user authenticated by the device authentication is allowed to operate the MFP 100 and use the copy function and the print function provided to the MFP 100. Further, a user authenticated by the transmission authentication is further allowed to use the transmission function of the MFP 100. In each of the device authentication and the transmission authentication, if a user does not operate the PANEL 106 for a predetermined time after the user is authenticated (after the user logs in), the authentication status is changed from an authenticated status to a deauthenticated status (logout status). This "predetermined time" is set to the MFP 100 in advance, and a timer (auto-logout timer) in the form of software counts this time. The auto-logout timer may be embodied in the form of hardware. In this case, when the auto-logout timer detects that the predetermined time has passed, an interrupt signal is issued to the CPU 101.

The MFP 100 according to the present exemplary embodiment can transmit image data generated through reading by the SCANNER 112 or image data stored in the HDD 110 to the outside of the apparatus via the NIC 104 and the LAN 700. This function is referred to as "image transmission function". A destination to which the MFP 100 transmits an image can be registered in advance into a destination table (address book) stored in the HDD 110 by an operation of the PANEL 106 or an operation from a not-illustrated client personal computer (PC) via the LAN 700. The destination table can store not only information about a destination but also authentication information (a username and a password) for user authentication processing required when the MFP 100 transmits an image to the destination, in such a manner that the authentication information is associated with the destination.

When the MFP 100 transmits an image, a plurality of destinations can be selected from the destination table via the PANEL 106. The MFP 100 transmits image data with use of communication protocols according to the respective selected destinations.

Further, the MFP 100 according to the present exemplary embodiment can be set in advance so as to operate in any one of an "each-time authentication mode" (or manual authentication mode) and an "automatic authentication mode" as an authentication operation mode when the MFP 100 transmits an image. When the MFP 100 is set to operate in the each-time authentication mode, the MFP 100 displays an authentication information input screen according to a transmission destination on the DISPLAY 108 at the time of an image transmission start, and performs user authentication according to the destination by using the authentication information that a user inputs through the PANEL 106. On the other hand, when the MFP 100 is set to operate in the automatic authentication mode, the MFP 100 performs user authentication according to a destination by using authentication information that is preregistered in the destination table so that the authentication information is associated with the specified destination.

Figure 3:
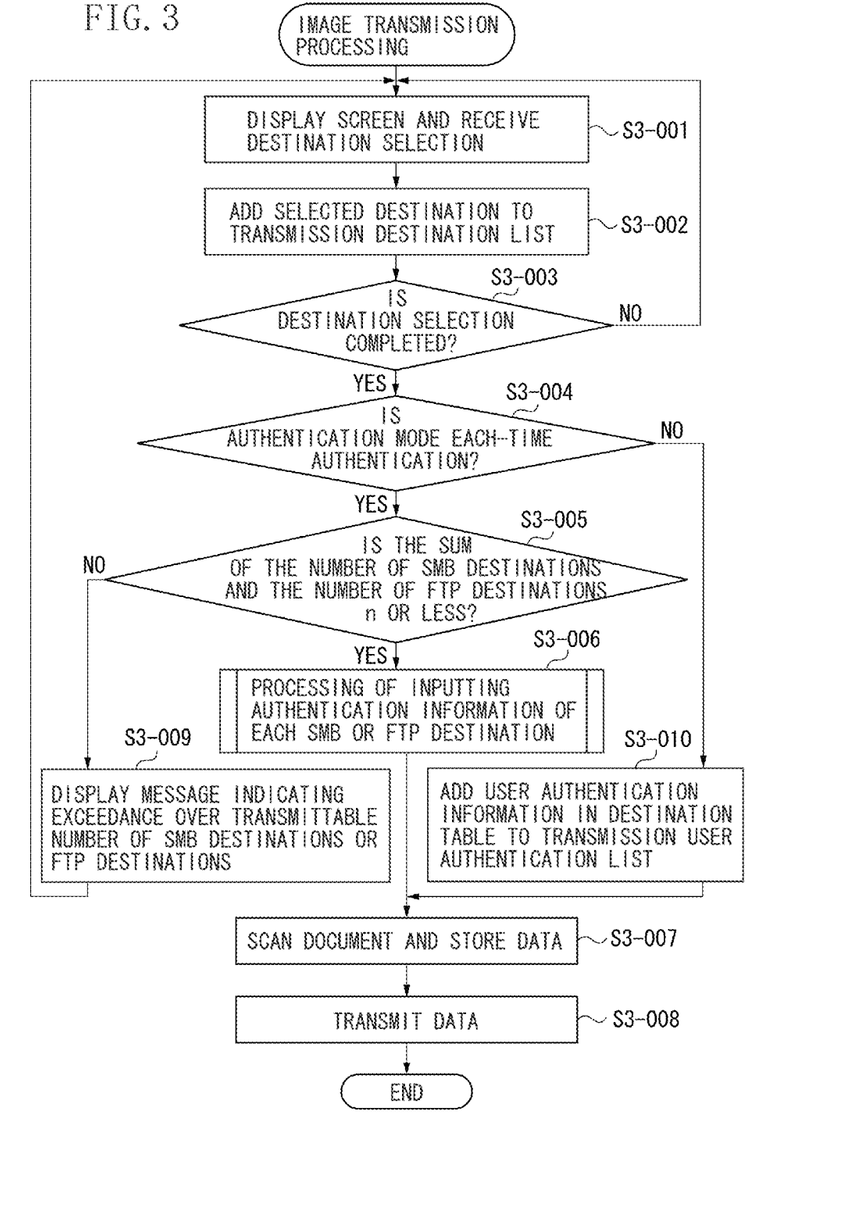
FIG. 3 is a flowchart illustrating an example of image transmission processing according to the exemplary embodiment of the present invention.

FIG. 3 is a flowchart illustrating an example of image transmission processing according to the present exemplary embodiment.

A program required for execution of the image transmission processing is stored in the ROM 102 or the HDD 110 together with the other programs for controlling the MFP 100. This program is loaded to the RAM 103 when the power source of the MFP 100 is turned on, and is executed by the CPU 101 when a user performs an operation of requesting an image transmission start. The programs for processing of the flowcharts that will be described below is also loaded the RAM 103 and is executed by the CPU 101 at an appropriate time in the same manner.

First, in step S3-001, the CPU 101 displays an image transmission operation screen on the DISPLAY 108, and receives user's image transmission operation.

Figure 7:
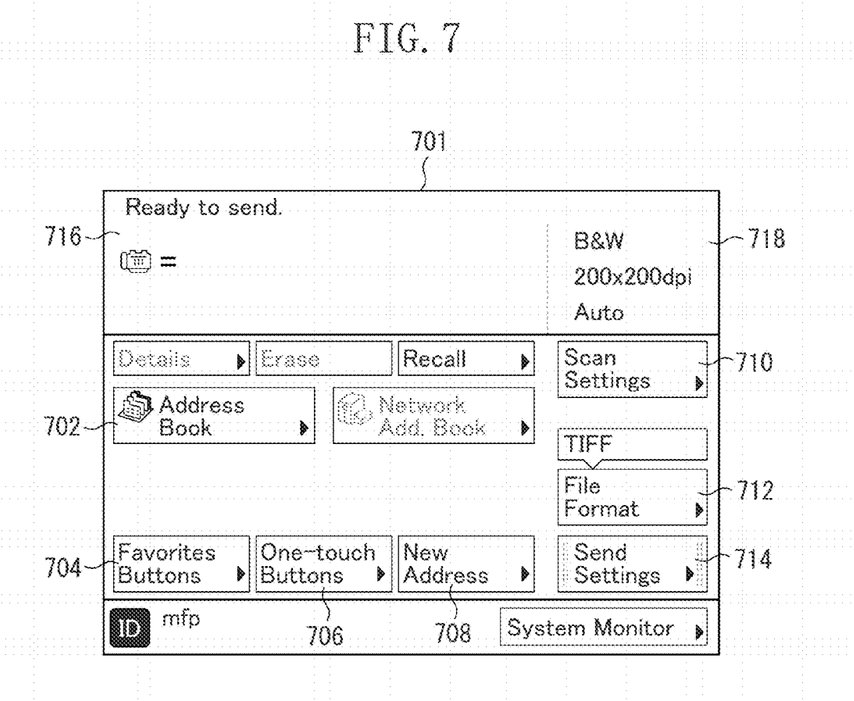
FIG. 7 illustrates an example of an image transmission operation screen.
Figure 8:
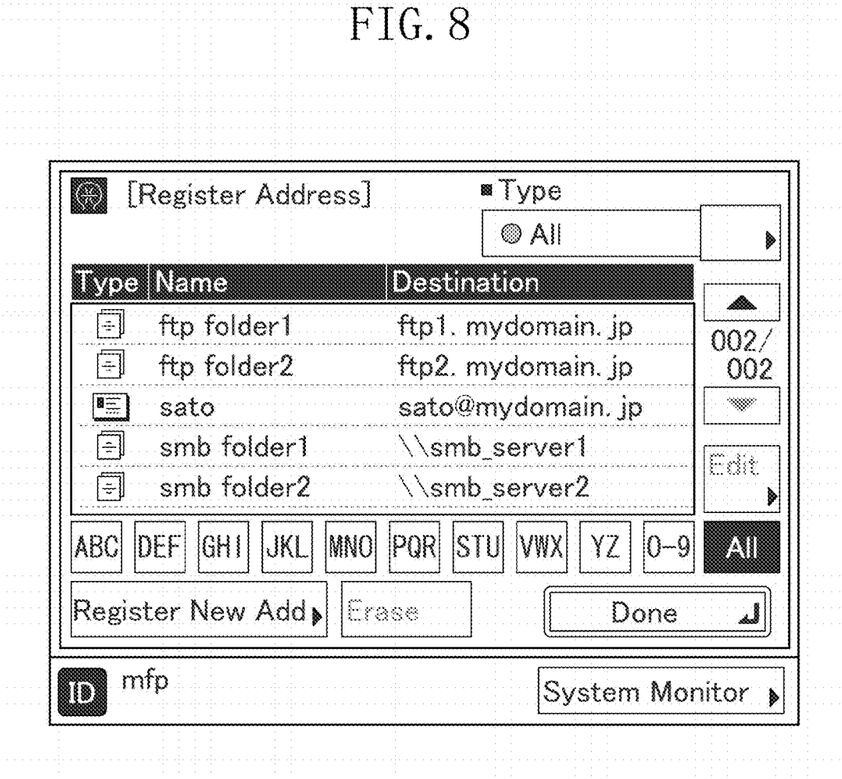
FIG. 8 illustrates an example of a screen showing a list of destinations in a destination table.

FIG. 7 illustrates an example of the image transmission operation screen. The image transmission operation screen 701 allows a user to select a destination of image transmission, the settings of the image transmission, and the settings of document scanning based on an operation instruction issued from the user. Now, the buttons displayed on the image transmission operation screen 701 will be described. An Address Book button 702 is a button for invoking the destination table stored in the HDD 110. Pressing of the Address Book button 702 causes an appearance of a screen showing a list of destinations registered in the destination table as illustrated in FIG. 8. A user can set a destination by selecting a desired destination from the list of the destinations displayed on the screen illustrated in FIG. 8. A Favorites button 704 is a button for invoking a preregistered combination of various settings including a destination and transmission settings. A One-Touch button 706 is a button for retrieving a preregistered destination. A New Address button 708 is a button used when a user newly inputs a destination that is not registered in the destination table. A user manually inputs a destination after pressing of the New Address button 708. An address set by an operation of the Address Book button 702, the Favorites button 704, the One-touch button 706, or the New Address button 708 is displayed in a display area 716.

When image data to be transmitted is image data obtained by scanning of a document, a user selects settings for scanning of the document. User's pressing of a Scan Settings button 710 causes a display of a screen for selecting detailed settings for scanning a document (resolution setting, and color-scanning/monochrome-scanning setting). On this screen, a user selects the detailed settings for scanning. The contents of the settings for scanning a document are displayed on a display area 718. A user can select a format of image data to be transmitted by pressing a File Format button 712. In the present exemplary embodiment, a user can select any of Tagged Image File Format (TIFF), Joint Photographic Experts Group (JPEG), and Portable Document Format (PDF) as a format of image data. Pressing of a Send Settings button 714 causes a transition to a screen for selecting detailed settings for image transmission.

Referring back to FIG. 3, when the user performs an operation of selecting a destination, the processing proceeds to step S3-002. In step S3-002, the CPU 101 adds the destination set in step S3-001 to a transmission destination list. The details of the transmission destination list will be described below.

Next, the processing proceeds to step S3-003, in which the CPU 101 determines whether one or more destinations are set, and the user instructs completion of the destination selection. If the transmission destination selection is completed (YES in step S3-003), the processing proceeds to step S3-004. If not (NO in step S3-003), the processing returns to step S3-001, in which the CPU 101 further receives an operation of selecting a transmission destination.

Figure 5:
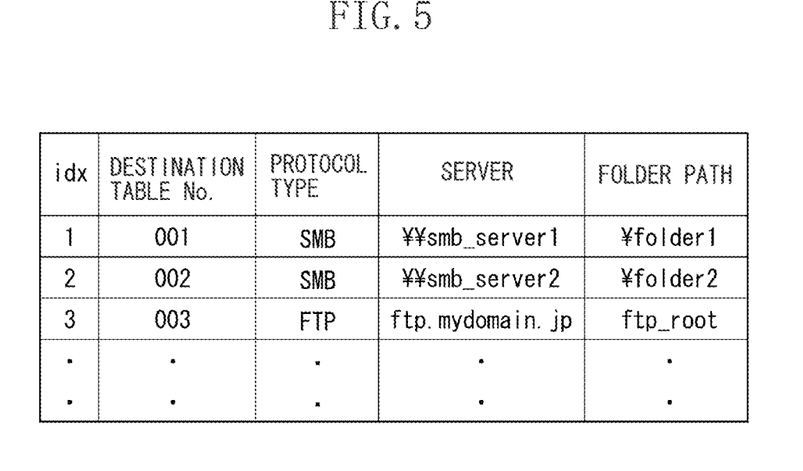
FIG. 5 illustrates an example of a transmission destination list.

FIG. 5 illustrates an example of the transmission destination list resulting from the execution of the processing in steps S3-001 to S3-003. The transmission destination list is a list generated in the RAM 103 for temporarily storing destinations set by a user. The transmission destination list illustrated in FIG. 5 indicates an example in which the destinations of Nos. 001, 002, and 003 in the destination table are set to indices 1, 2, and 3, respectively.

In step S3-004, the CPU 101 determines which is selected as the setting of the authentication operation mode, the each-time authentication mode or the automatic authentication mode. The authentication operation mode can be set on the DISPLAY 108 or by an operation from a not-illustrated client PC connected via the LAN 700, and the setting content is stored in the HDD 110.

Figure 11:
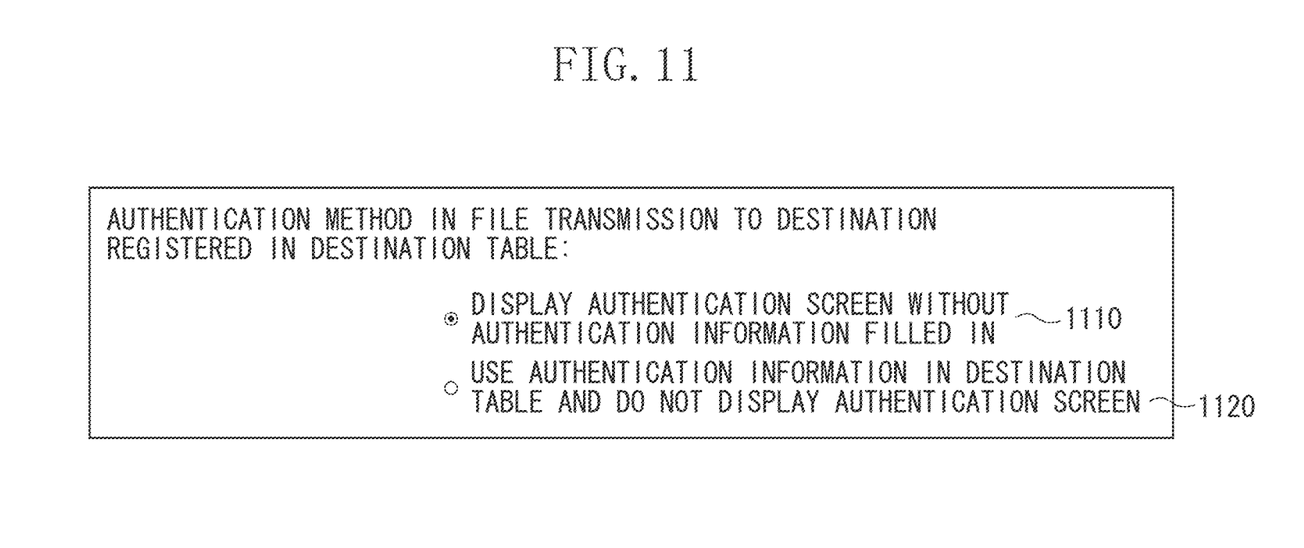
FIG. 11 illustrates an example of an authentication operation mode setting screen.

FIG. 11 illustrates an example of an authentication operation mode setting screen for setting either the each-time authentication mode or the automatic authentication mode. The selection of a radio button 1110 results in the selection of the each-time authentication mode, while the selection of a radio button 1120 results in the selection of the automatic authentication mode. The authentication operation mode selected on the screen illustrated in FIG. 11 is stored in the HDD 110. If the each-time authentication mode is selected as the authentication operation mode (YES in step S3-004), the processing proceeds to step S3-005. If not (NO in step S3-004), the processing proceeds to step S3-010. In step S3-010, the CPU 101 reads authentication information corresponding to each transmission authentication preregistered in the destination table, and adds this authentication information to an authentication information list. Then, the processing proceeds to step S3-007. The details of the authentication information list will be described below.

In step S3-005, the CPU 101 checks the type of a communication protocol of each transmission destination registered in the transmission destination list. If the sum of the number of destinations to be transmitted using the SMB protocol and the number of destinations to be transmitted using the FTP protocol is within the range of n (n≥1) which is a preset upper limit number (YES in step S3-005), the processing proceeds to step S3-006. If not (NO in step S3-005), the processing proceeds to step S3-009, in which the CPU 101 displays, on the DISPLAY 108, a message notification screen indicating "you cannot specify more than n destinations as destinations using the SMB or FTP protocol in the each-time authentication mode". Then, the processing returns to step S3-001.

Figure 9:
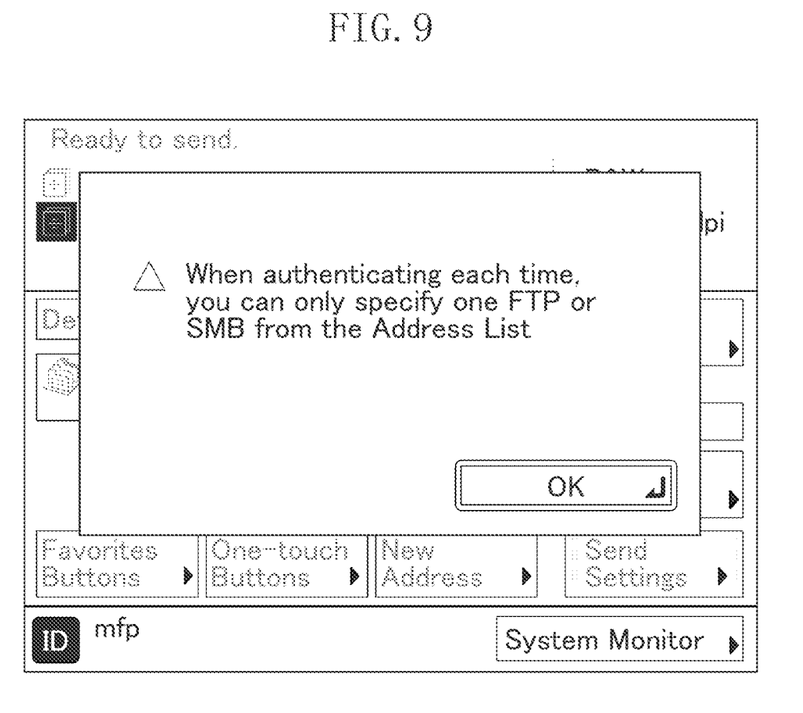
FIG. 9 illustrates an example of a display screen displayed on a display unit in step S3-009 in FIG. 3.

FIG. 9 illustrates an example of the display screen displayed on the DISPLAY 108 in step S3-009. FIG. 9 illustrates an example of the display screen when "1" is set as a preset upper limit number of destination. The upper limit number n may be not a fixed value to the MFP 100. The present exemplary embodiment allows the upper limit number to be set by an operation on the DISPLAY 108 or an operation from a not-illustrated client PC via the LAN 700.

In step S3-006, the CPU 101 displays, on the DISPLAY 108, an authentication information input screen which receives an input of authentication information of each of the destinations using SMB and the destinations using FTP contained in the transmission destination list. Then, the CPU 101 receives the user's operation of inputting authentication information to the PANEL 106. The authentication information input at this time is temporarily stored in the RAM 103 as the authentication information list. The details of the processing in step S3-006 will be described below. Once the authentication information input is completed in step S3-006, the processing proceeds to step S3-007.

In step S3-007, the CPU 101 reads a document set on the SCANNER 112, and temporarily stores this data in the RAM 103 or the HDD 110 illustrated in FIG. 2. Alternatively, the CPU 101 may specify image data stored in advance in the HDD 110 as image data to be transmitted according to user's instruction.

In step S3-008, the CPU 101 sequentially transmits the image data to each of the transmission destinations registered in the transmission destination list. In transmission of image data, the CPU 101 performs authentication processing required for each destination. The CPU 101 uses the authentication information stored in the above-described transmission authentication information list as authentication information required for the authentication processing. Then, upon completion of image data transmission to the transmission destinations registered in the transmission destination list, the present flowchart is ended.

Figure 4:
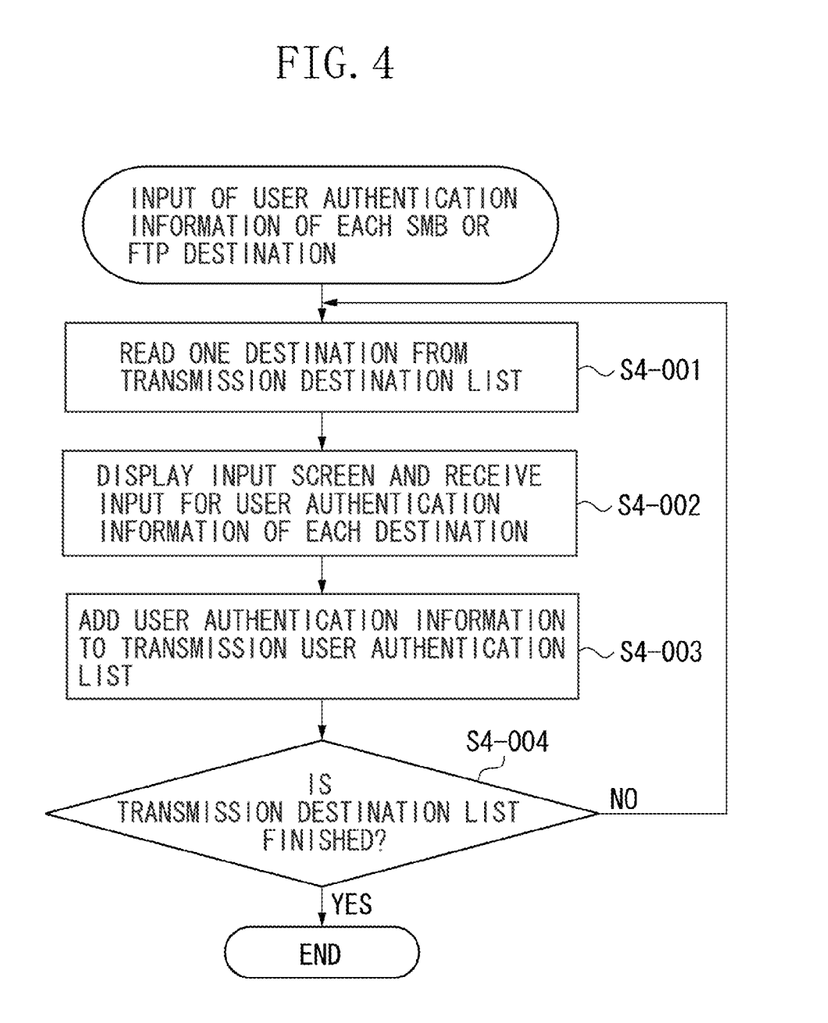
FIG. 4 is a flowchart illustrating an example of authentication information input processing.

FIG. 4 is a flowchart illustrating an example of the authentication information input processing performed in step S3-006 illustrated in FIG. 3.

In step S4-001, the CPU 101 reads transmission destination information from the first destination of the transmission destination list. For example, the CPU 101 reads the transmission destination information from idx=1 in the transmission destination list illustrated in FIG. 5. Then, the processing proceeds to step S4-002, in which the CPU 101 displays, on the DISPLAY 108, the authentication information input screen for inputting authentication information of the transmission destination read in step S4-001. At this time, the CPU 101 displays a screen prompting the user to input at least a username and a password.

Figure 10:
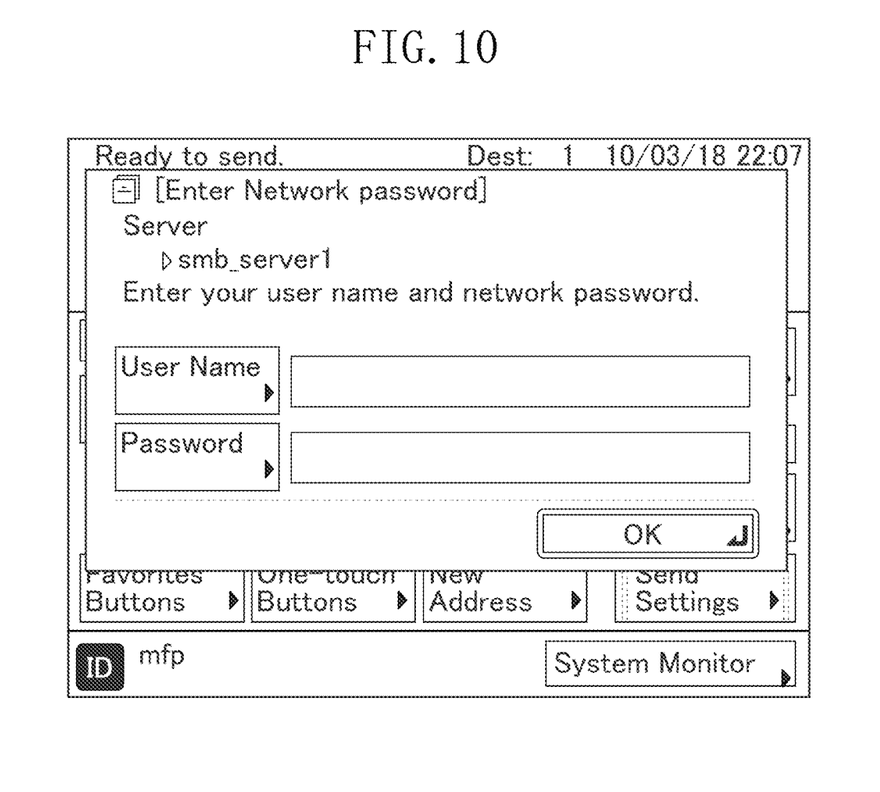
FIG. 10 illustrates an example of a screen prompting a user to input authentication information.

FIG. 10 illustrates an example of the screen displayed in step S4-002. The screen illustrated in FIG. 10 is a screen prompting a user to input authentication information for the destination "smb_server1", which is an example of the destination.

In step S4-003, the CPU 101 adds the authentication information entered in step S4-002 to the authentication information list.

Figure 6:
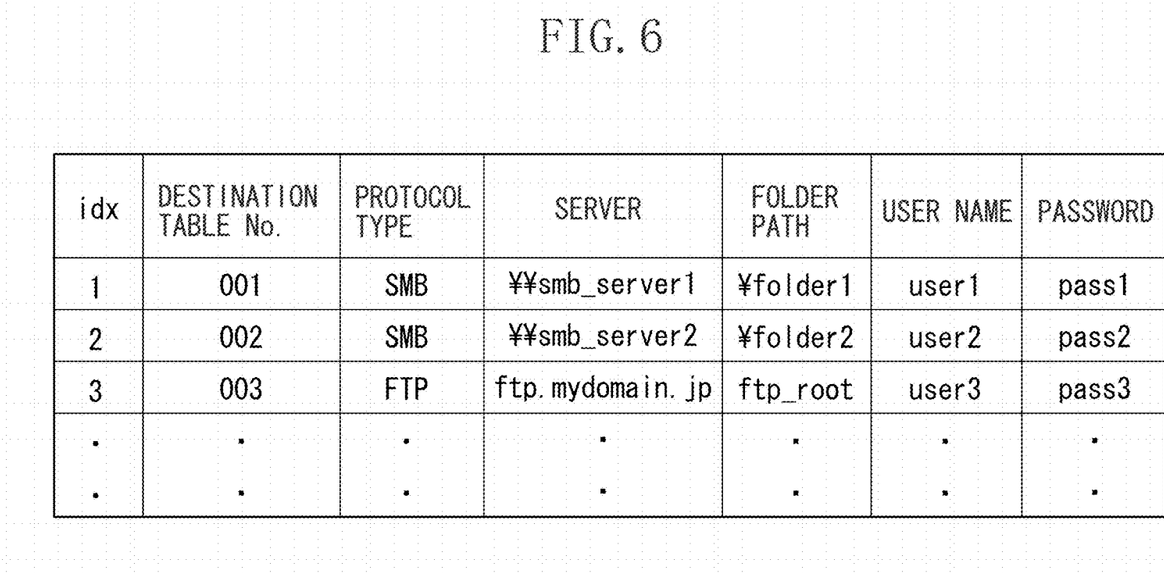
FIG. 6 illustrates an example of an authentication information list.

FIG. 6 illustrates an example of the authentication information list. The list illustrated in FIG. 6 stores authentication information in such a manner that the authentication information is associated with the corresponding transmission destination information.

In step S4-004, the CPU 101 checks whether the processing reaches the last destination in the transmission destination list. If the processing reaches the last destination, i.e., the CPU 101 has performed the processing in steps S4-001 to S4-003 up to the last idx in the destination list illustrated in FIG. 5 (YES in step S4-004), then the authentication information input processing is ended. If not (NO in step S4-004), idx is incremented by one, and the processing returns to step S4-001.

According to the present exemplary embodiment as described above, the MFP 100 limits the number of destinations for multi-address transmission when the MFP 100 transmits data under a combination of the multi-address transmission and the each-time authentication. As a result, it can be prevented that a user inputs incorrect authentication information, which makes normal execution of the multi-address transmission impossible. Further, it is possible to execute the multi-address transmission function and the each-time authentication transmission function even at an image transmission apparatus having little available space in, for example, a memory resource, while maintaining the usability thereof.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-102526 filed Apr. 27, 2010, which is hereby incorporated by reference herein in its entirety.

What is claimed is:

1. An image transmission apparatus comprising:
a storage unit configured to store an address book, wherein a plurality of destinations and a plurality of pieces of authentication information each being associated with a different one of the plurality of destinations are registered in the address book;
a destination setting unit configured to set a destination for transmitting image data, the destination being selected from the address book stored in the storage unit;
a transmission unit configured to transmit the image data to the destination set by the destination setting unit;
an authentication unit configured to perform processing for authentication required for the transmission unit to transmit the image data to the destination set by the destination setting unit, wherein the processing performed by the authentication unit is performed after the destination setting unit has set the destination;
a selection unit configured to select one of a first authentication mode, in which the authentication unit performs the processing for authentication by using the authentication information, stored in the storage unit, corresponding to the destination selected from the address book and a second authentication mode, in which the authentication unit performs the processing for authentication by using authentication information, which is entered by a user, when the transmission unit transmits the image data to the destination set by the destination setting unit; and
a limitation unit configured to limit a total number of destinations, set by the destination setting unit, to at most a preset upper limit to which the transmission unit transmits the image data in a case that the selection unit selects the second authentication mode, wherein in a case where the selection unit selects the first authentication mode, the total number of destinations for the image data to be transmitted by the transmission unit is not limited to the preset upper limit.

2. The image transmission apparatus according to claim 1, further comprising an upper limit number setting unit configured to set the preset upper limit number of destinations to which the transmission unit can transmit the image data by multi-address transmission in a case that the selection unit selects the second authentication mode, wherein the limitation unit limits the number of destinations to which the transmission unit transmits the image data by the multi-address transmission according to the upper limit number set by the upper limit number setting unit.

3. The image transmission apparatus according to claim 2, further comprising a notification unit configured to issue a notification indicating a limitation of the number of transmission destinations to the user, in a case that the selection unit selects the second authentication mode and the destination setting unit sets transmission destinations whose number exceeds the upper limit number set by the upper limit number setting unit.

4. The image transmission apparatus according to claim 1, wherein the transmission unit is capable of transmitting the image data by a plurality of types of transmission methods, and wherein the limitation unit limits the number of destinations to which the transmission unit transmits the image data by multi-address transmission using a predetermined type of transmission method among the plurality of types of transmission methods.

5. The image transmission apparatus according to claim 1, further comprising an authentication mode setting unit configured to set whether the authentication unit performs the authentication in the first authentication mode or the second authentication mode, wherein the selection unit selects one of the first authentication mode and the second authentication mode according to a setting content set by the authentication mode setting unit.

6. An image transmission apparatus comprising:
a destination setting unit configured to set a destination for transmitting image data;
a transmission unit configured to transmit the image data to the destination set by the destination setting unit;
an authentication unit configured to perform processing for authentication required for the transmission unit to transmit the image data to the destination set by the destination setting unit, wherein the processing performed by the authentication unit is performed after the destination setting unit has set the destination; and
a limitation unit configured to, when the transmission unit transmits the image data to a plurality of destinations set by the destination setting unit, limit a total number of destinations, among the plurality of destinations, set by the destination setting unit, to at most a preset upper limit, that are authenticated in a manual authentication mode in which the authentication unit performs the processing for authentication by using authentication information, which is manually entered by a user,
wherein in an automatic authentication mode in which the authentication information is automatically entered, the limitation unit does not limit the total number of destinations to the preset upper limit.

7. A method for controlling an image transmission apparatus for transmitting image data to a plurality of destinations by multi-address transmission, the method comprising:
storing an address book, wherein a plurality of destinations and a plurality of pieces of authentication information each being associated with a different one of the plurality of destinations are registered in the address book;
setting a destination for transmitting image data, the destination being selected from the address book stored in the storage unit;
selecting one of a first authentication mode, in which the processing for authentication is performed by using authentication information, stored in a storage unit, corresponding to the destination selected from the address book and a second authentication mode, in which the processing for authentication is performed by using authentication information, which is entered by a user;
limiting a total number of destinations, set by the destination setting unit, to at most a preset upper limit to which the image data is transmitted in a case that the second authentication mode is selected;
performing processing for authentication required to transmit the image data to the set destination according to the selected authentication mode, wherein the processing performed by the authentication is performed after the destination is set; and
transmitting the image data to the set destination,
wherein in a case where the first authentication mode is selected, the total number of destinations for the image data to be transmitted is not limited to the preset upper limit.

8. A method for controlling an image transmission apparatus for transmitting image data to a plurality of destinations by multi-address transmission, the method comprising:
setting a destination for transmitting image data;
limiting a total number of destinations, set by the destination setting unit, to at most a preset upper limit, to be authenticated in a manual authentication mode in which the processing for authentication is performed by using authentication information, which is manually entered by a user, in a case that the image data is transmitted to the set plurality of destinations;
performing processing for authentication required to transmit the image data to the set destination, wherein the processing is performed after the destination has is set; and
transmitting the image data to the set destination,
wherein in an automatic authentication mode in which the authentication information is automatically entered, the total number of destinations to the preset upper limit are not limited.

9. A non-transitory computer-readable storage medium storing a computer program for causing a computer to execute a method for controlling an image transmission apparatus for transmitting image data to a plurality of destinations by multi-address transmission, the control method comprising:
storing an address book, wherein a plurality of destinations and a plurality of pieces of authentication information each being associated with a different one of the plurality of destinations are registered in the address book;
setting a destination for transmitting image data, the destination being selected from the address book stored in the storage unit;
selecting one of a first authentication mode, in which the processing for authentication is performed by using authentication information, stored in a storage unit, corresponding to the destination selected from the address book and a second authentication mode, in which the processing for authentication is performed by using authentication information, which is entered by a user;

limiting a total number of destinations, set by the destination setting unit, to at most a preset upper limit to which the image data is transmitted in a case that the second authentication mode is selected;

performing processing for authentication required to transmit the image data to the set destination according to the selected authentication mode, wherein the processing performed by the authentication is performed after the destination is set; and transmitting the image data to the set destination, wherein in a case where the first authentication mode is selected, the total number of destinations for the image data to be transmitted is not limited to the preset upper limit.

10. A non-transitory computer-readable storage medium storing a computer program for causing a computer to execute a method for controlling an image transmission apparatus for transmitting image data to a plurality of destinations by multi-address transmission, the control method comprising:

setting a destination for transmitting image data;

limiting a total number of destinations, set by the destination setting unit, to at most a preset upper limit, to be authenticated in a manual authentication mode in which the processing for authentication is performed by using authentication information, which is manually entered by a user, in a case that the image data is transmitted to the set plurality of destinations;

performing processing for authentication required to transmit the image data to the set destination, wherein the processing is performed after the destination has is set; and transmitting the image data to the set destination, wherein in an automatic authentication mode in which the authentication information is automatically entered, the total number of destinations to the preset upper limit are not limited.

* * * * *